US012773675B2

(12) United States Patent
Leonard, III et al.

(10) Patent No.: US 12,773,675 B2
(45) Date of Patent: Oct. 27, 2026

(54) REACTOR FOR PROCESSING GAS

(71) Applicant: RECARBON, INC., Santa Clara, CA (US)

(72) Inventors: George Stephen Leonard, III, San Jose, CA (US); John Joseph Rehagen, Sunnyvale, CA (US); Stefan Andrew McClelland, San Jose, CA (US)

(73) Assignee: ReCarbon, Inc., Santa Clara, CA (US)

( * ) Notice: Subject to any disclaimer, the term of this patent is extended or adjusted under 35 U.S.C. 154(b) by 1095 days.

(21) Appl. No.: 17/649,795

(22) Filed: Feb. 2, 2022

(65) Prior Publication Data

US 2023/0241574 A1 Aug. 3, 2023

(51) Int. Cl.
*B01J 19/24* (2006.01)
*B01J 19/00* (2006.01)

(52) U.S. Cl.
CPC ......... *B01J 19/2405* (2013.01); *B01J 19/006* (2013.01); *B01J 19/245* (2013.01); *B01J 19/248* (2013.01); *B01J 2219/00763* (2013.01); *B01J 2219/1943* (2013.01)

(58) Field of Classification Search
CPC .... B01J 19/2405; B01J 19/006; B01J 19/245; B01J 19/248; B01J 2219/00763; B01J 2219/1943; B01J 2219/00121; B01J 4/001; B01J 12/00
USPC .......................................................... 422/228
See application file for complete search history.

(56) References Cited

U.S. PATENT DOCUMENTS 7,452,513 B2 11/2008 Matveev
10,832,893 B2 11/2020 McClelland et al.
2002/0127155 A1 9/2002 Minaee et al.
2006/0062705 A1 3/2006 Kanno et al.
2012/0034137 A1* 2/2012 Risby ................ H01J 37/32357 422/186.29

(Continued)

FOREIGN PATENT DOCUMENTS

JP 2012518262 A 8/2012
JP 2022525648 A 5/2022
JP 2022525649 A 5/2022

(Continued)

OTHER PUBLICATIONS

International Search Report and Written Opinion in PCT/US2023/061886 mailed Aug. 2, 2023.

(Continued)

*Primary Examiner* — Huy Tram Nguyen

(74) *Attorney, Agent, or Firm* — Buchalter; Jason W. Croft

(57) ABSTRACT

A gas reactor may include a reactor chamber having a first end, a second end, and a lateral surface that extends between the first end and the second end. The gas reactor may include a torch inlet positioned at the first end of the reactor chamber, and the torch inlet may be configured for input flow of a fuel in a first flow direction. The gas reactor may include a reactant inlet positioned at the second end of the reactor chamber and configured to cause a reactant to flow into the reactor chamber in a second flow direction. The fuel or the reactant may move through the reactor chamber in a vortex flow pattern. The gas reactor may include an outlet port positioned at the second end of the reactor chamber in which the outlet port is configured for output flow of a product from the reactor chamber.

19 Claims, 4 Drawing Sheets

(56) References Cited

U.S. PATENT DOCUMENTS

2016/0194202 A1 7/2016 Rabinovich et al.

FOREIGN PATENT DOCUMENTS

WO 2010060213 A 6/2010
WO 2012023858 A1 2/2012

OTHER PUBLICATIONS

Examination Report in Canadian patent application No. 3,246,706 mailed Aug. 21, 2025.
Office Action of Korean Patent Application No. 10-2024-7024811 mailed Aug. 21, 2025, 18 pages with translations.
Office Action of Japanese Patent Application No. 2024-541670 mailed Nov. 18, 2025, 8 pages with translations.
Extended European Search Report for 23750414.7 mailed Jan. 2, 2026, 7 pages.

* cited by examiner

REACTOR FOR PROCESSING GAS

BACKGROUND

Gas reactions may be affected within a reactor chamber of a gas reactor configured for inlet and outlet flow of gases. The inlet flow of gases may include one or more gas reactants, and the outlet flow may include one or more gas products generated based on the gas reactants included in the inlet flow. In some situations, gas reactions may be exothermic reactions that produce heat during the reaction process, while in other situations, the gas reactions may be endothermic reactions that require heat input to drive the reaction process. As such, the reactor chamber in which the gas reactions occur may reach high temperatures during operation of the gas reactor.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a gas reactor may include a reactor chamber having a first end, a second end, and a lateral surface that extends between the first end and the second end. The gas reactor may include a torch inlet positioned at the first end of the reactor chamber, and the torch inlet may be configured for input flow of a fuel in a first flow direction. The gas reactor may also include a reactant inlet positioned at the second end of the reactor chamber and configured to cause a reactant to flow into the reactor chamber in a second flow direction. The fuel or the reactant may move through the reactor chamber in a vortex flow pattern. The gas reactor may additionally include an outlet port positioned at the second end of the reactor chamber in which the outlet port is configured for output flow of a product from the reactor chamber.

A method of performing a chemical reaction using a gas reactor according to the present disclosure may include inputting a fuel into a fuel inlet at a first end of a reactor chamber of a gas reactor to cause the fuel to flow in a first flow direction in the reactor chamber, wherein the reactor chamber includes the first end, a second end, and a lateral surface. The method may include providing a gas reactant into a gas reactant inlet to the reactor chamber to cause the gas reactant to flow in a second flow direction in the reactor chamber. The method may also include providing, in the reactor chamber, a vortex flow pattern for one or more of the fuel or gas reactant to move within the reactor chamber. The method may additionally include outputting a product based on the fuel and the gas reactant through an outlet port at a second end of the reactor chamber.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

A gas reactor may be configured to perform one or more gas reactions within a reactor chamber of the gas reactor. In some situations, the gas reactions occurring in the reactor chamber may include endothermic reactions where product production is facilitated by inputting heat to the gas reactants. As such, the gas reactor may include a heat input stream to drive endothermic gas reactions. In some embodiments, the heat input stream may include a torch inlet that may heat an unreactive chemical, such as an inert gas, to provide heat for the gas reactants in the reactor chamber.

However, the heat introduced into the reactor chamber by the torch inlet may increase the temperature of the gas reactor beyond the temperature limits of the material, which may cause damage to or reduce the longevity of one or more components of the gas reactor, such as the reactor chamber. Consequently, there may be a trade-off between effectively facilitating endothermic gas reactions and reducing wearing of the gas reactor caused by the high temperatures needed for the gas reactions.

A gas reactor according to at least one embodiment of the present disclosure may provide sufficient heat to affect endothermic gas reactions while also limiting the temperature of the walls of the reactor chamber. As such, gas reactions may be provided with enough heat to produce gas products, while the gas reactor itself is not degraded by the high temperatures. The gas reactor according to the present disclosure may provide a particular thermal profile in which the center of the gas reactor includes higher temperatures while temperatures at or near the walls and/or surfaces of the gas reactor include lower temperatures. In some embodiments, the temperatures near one or more walls of the gas reactor may be lower than temperatures of other existing gas reactors that radiate heat from the center of the existing gas reactors because the gas reactants in the gas reactor according to the present disclosure may impart a temperature shielding effect on the walls of the gas reactor. Additionally or alternatively, the flow of gas reactants and the heated fuel gas for facilitating the gas reactions may improve the mixing of the gas reactants, which may further improve the degree of completion of the gas reaction.

Embodiments of the present disclosure are explained with reference to the accompanying figures.

Figure 1:
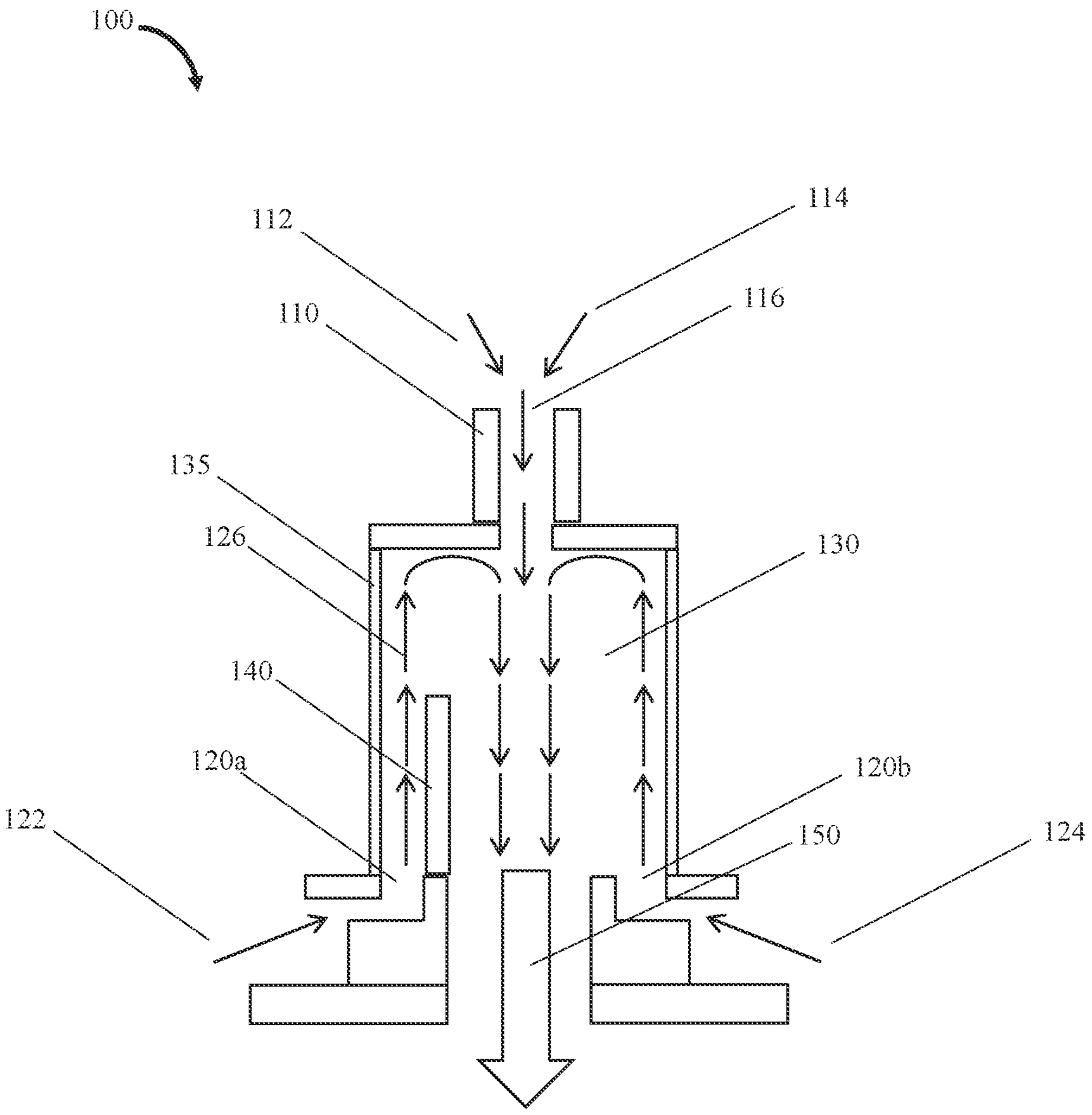
FIG. 1 is a diagram of a first example embodiment of a gas reactor according to the present disclosure.

FIG. 1 is a diagram of a first example embodiment of a gas reactor 100 according to the present disclosure. The gas reactor 100 may include a torch inlet port 110 that is configured for input of a torch gas inlet stream 116. In some embodiments, the torch gas inlet stream 116 may include a mixture of gases coming from a fuel inlet stream 112 and an oxidizer inlet stream 114. For example, the oxidizer inlet stream 114 may include gases such as oxygen, chlorine, or nitrous oxide, and the fuel inlet stream 112 may include gases such as hydrogen or hydrocarbons.

The gas reactor 100 may include a reactor chamber 130 into which the torch gas inlet stream 116 and one or more gas reactants (e.g., gas reactants 122 and 124) may flow and out from which one or more gas products may flow. As such, the torch inlet port 110, one or more gas reactant inlet ports (e.g., the gas reactant inlet ports 120*a* and 120*b*), and a torch outlet 150 may be connected to the reactor chamber 130. In some embodiments, the reactor chamber 130 may include a hollow interior cavity with a first end, which may include a top surface, and a second end, which may include a bottom surface. The first end and the second end of the reactor chamber 130 may be connected by one or more lateral surfaces that may provide the reactor chamber 130 a particular shape with a constant or variable cross-section. For example, the reactor chamber 130 may include a single rounded lateral surface such that the reactor chamber 130 has a circular cross-section and a cylindrical or tube shape. As another example, the reactor chamber 130 may include four lateral surfaces (such that the reactor chamber 130 has a rectangular prism shape), five lateral surfaces (for a pentagonal prism shape), six lateral surfaces (for a hexagonal prism shape), eight lateral surfaces (for an octagonal prism shape), etc.

The gases used in the fuel inlet stream 112 and the oxidizer inlet stream 114 may be selected based on the particular gas reaction to occur in the gas reactor 100 to ensure that the gases included in the fuel inlet stream 112 and the oxidizer inlet stream 114 do not adversely affect the gas reactions. For example, introducing chlorine gas into the reactor chamber 130 of the gas reactor 100 via the oxidizer inlet stream 114 may cause unwanted side reactions that produce unexpected or undesirable products to occur, while using oxygen gas may not lead to any side reactions or drive desirable chemical reactions (e.g., chemical reactions that result in target products); in this example, the oxygen gas may be selected as an oxidizing agent for input via the oxidizer inlet stream 114. The same or a similar consideration may be made for the fuel inlet stream 112 such that a selected fuel gas input into the fuel inlet stream 112 does not affect unexpected or unwanted side reactions. Additionally or alternatively, selection of the gases for the fuel inlet stream 112 or the oxidizer inlet stream 114 may include considerations such as temperature volatility, costs, recyclability, or any other factors.

In some embodiments, the torch inlet port 110 may be configured to allow the torch gas inlet stream 116 to enter from a top of the reactor chamber 130 and flow through the reactor chamber 130 towards the torch outlet 150. In these and other embodiments, the torch outlet 150 may be positioned along any surfaces of the reactor chamber 130, and the gas flow associated with the torch gas inlet stream 116 may be directed toward the torch outlet 150 based on the geometry of the reactor chamber 130. For example, the torch outlet 150 may be positioned on a bottom surface of the reactor chamber 130 such that the torch inlet port 110 at the top of the reactor chamber 130 flows through the reactor chamber 130 at the bottom of the reactor chamber 130.

The gas reactor 100 may include one or more gas reactant inlet ports 120*a* and 120*b* that are configured for input of one or more gas reactants 122 and 124 into the gas reactor 100. In some embodiments, the gas reactant inlet ports 120*a* and 120*b* may be positioned on a lateral and/or a bottom surface of the reactor chamber 130 (e.g., at an interface between the lateral and bottom surfaces of the reactor chamber 130) so that one or more reactant gases may flow into the reactor chamber 130 through each of the gas reactant inlet ports 120*a* and 120*b*. In these and other embodiments, the gas reactants 122 and 124 may flow towards the top of the reactor chamber 130 because the gas reactants 122 and 124 are injected into the reactor chamber 130 from the bottom surface in an upward-facing orientation (e.g., toward the top surface, or toward the torch inlet port 120). In these and other embodiments, the gas reactants 122 and 124 may include gases such as carbon monoxide, hydrogen gas, water vapor, carbon dioxide, or hydrocarbon gases. The position and/or shape of the gas reactant inlet ports 120 may contribute to or cause a vortex flow pattern in the gas reactor 100.

The gas reactants 122 and 124 may be injected into the reactor chamber 130 at some angle, such as at least partially tangentially, with respect to one or more lateral surfaces 135 of the reactor chamber 130 (e.g., the flow direction of the gas reactants 122 and 124 may be non-parallel with respect to the lateral surfaces 135) to create one or more vortex reactant streams 126 as the gas reactants 122 and 124 flow towards the top of the reactor chamber 130. Consequently, the vortex reactant streams 126 of the gas reactants 122 and 124 may initially flow in a direction opposite to the direction of the torch gas inlet stream 116, which may facilitate countercurrent heat exchange between the vortex reactant streams 126 and the torch gas inlet stream 116, which improves heat transfer between the two streams relative to concurrent flow of the torch gas inlet stream 116 and the vortex reactant streams 126.

In these and other embodiments, the "vortex reactant streams" and any other descriptions of vorticity relating to one or more streams of gases may refer to a flow pattern of the streams that moves in a spiraling or a substantially spiraling pattern in a particular direction. The vortex stream may include greater or lesser vorticity based on a "curling" of the vortex stream that describes a number of rotations of the vortex stream over a given distance. The vortex stream, for example, may generally move in any direction (e.g., from a first end of the reactor chamber 130 to a second end of the reactor chamber 130) with low vorticity (e.g., with a first number of rotations over a height of the reactor chamber 130) or a higher vorticity (e.g., with a second number of rotations over the height of the reactor chamber in which the second number is greater than the first number).

Further, the vortex reactant streams 126 may flow in an upward direction closer to the lateral surfaces 135 of the reactor chamber 130, while the torch gas inlet stream 116 flows in a downward direction near a center of the reactor chamber 130. Because the vortex reactant streams 126 may include gases having a lower temperature than the gases included in the torch gas inlet stream 116, the lateral surfaces 135 of the reactor chamber 130 may be shielded from high temperatures that are greater than the tolerable operating conditions of the material making up the reactor chamber 130 by the relatively cooler vortex reactant streams 126.

After the vortex reactant streams 126 reaches an end of the reactor chamber 130 (e.g., the interior top surface of the reactor chamber 130), the stream of gas reactants may invert and flow concurrently with the torch gas inlet stream 116 towards the bottom of the reactor chamber 130 and the torch outlet 150. In some embodiments, the vortex reactant streams 126 may mix with the torch gas inlet stream 116 during the concurrent gas flow towards the torch outlet 150. In these and other embodiments, the turbulent fluid flow (i.e., non-laminar flow) of the vortex reactant streams 126 may facilitate the mixing of the gas reactants with the torch gas inlet stream 116. As such, the arrangement of the torch gas inlet stream 116 and the gas reactant inlet ports 120*a* and 120*b* as illustrated in relation to the gas reactor 100 may facilitate heating and mixing of the gas reactants, which may improve the reaction processes involving the gas reactants.

In some embodiments, the reactor chamber 130 may include one or more baffles 140 that are configured to facilitate the vortex flow of the vortex reactant streams 126. In these and other embodiments, the baffles 140 may be positioned along the path of the vortex reactant streams 126 to at least partially guide or obstruct the flow of gases, which may result in increased vorticity of the gas flow. The baffles 140 may be coupled to one or more lateral surfaces of the reactor chamber 130 or extend from a top surface or a bottom surface of the reactor chamber 130.

Additionally or alternatively, the geometry of the gas reactant inlet ports 120*a* and 120*b* or the reactor chamber 130 may be shaped to provide or increase the vorticity of the gas flow. For example, the gas reactant inlet ports 120*a* and 120*b* may include a curved profile at the point where the gas reactant inlet ports 120*a* and 120*b* are connected to the reactor chamber 130 to increase the vorticity of the gas flow. As another example, the reactor chamber 130 may include a cylindrical shape or rounded internal edges or corners that guide the gas flow in a vortexing pattern. In these and other embodiments, forming or facilitating the vortexing pattern of the gas flow may be accomplished with any method or technique, including those described in U.S. Pat. No. 10,832,893, issued on Nov. 10, 2020 to McClelland et al., which is incorporated by reference in its entirety.

Additionally or alternatively, any other methods of affecting a vortexing gas flow may be used. For example, the reactor chamber 130 and/or the gas reactant inlet ports 120*a* and 120*b* may be rotated at a particular rate to facilitate vorticity of the gas flow. As another example, one or more inert gas streams (not shown) may be injected into the reactor chamber 130 to change the directions of one or more of the streams of gas and increase their vorticity.

After being heated by and mixed with the torch gas inlet stream 116, the gas reactants may yield one or more gaseous products. The fuel gas, the oxidizer gas, the gaseous products, and any residual gas reactants 122 and 124 may flow out of the gas reactor 100 via the torch outlet 150. In some embodiments, the torch outlet 150 may direct the various gases into a heat exchanger, piping, or another reactor to separate the mixed gases (e.g., via fractional distillation, membrane separation, pressure swing adsorption, or any other material separation method) or for further processing. In these and other embodiments, the gaseous products may include gases such as methanol, ethanol, ammonia, hydrogen gas, or any other mixed gases (e.g., synthesis gas or “syngas”). Additionally or alternatively, the gas reactor may be configured to output liquid or solid products or intermediate products that are further processed to yield a final product. For example, reaction of the gas reactants in the gas reactor 100 may yield a polymeric plastic, a polymeric plastic monomer, a fabric, or various industrial chemicals.

Modifications, additions, or omissions may be made to the gas reactor 100 without departing from the scope of the present disclosure. For example, the designations of different elements in the manner described is meant to help explain concepts described herein and is not limiting. For instance, in some embodiments, the fuel gas, the oxidizer gas, the torch gas inlet stream 116, the gas reactants 122 and 124, and the gas reactant inlet ports 120*a* and 120*b* are delineated in the specific manner described to help with explaining concepts described herein but such delineation is not meant to be limiting. Further, the gas reactor 100 may include any number of other elements or may be implemented within other systems or contexts than those described.

Figure 2:
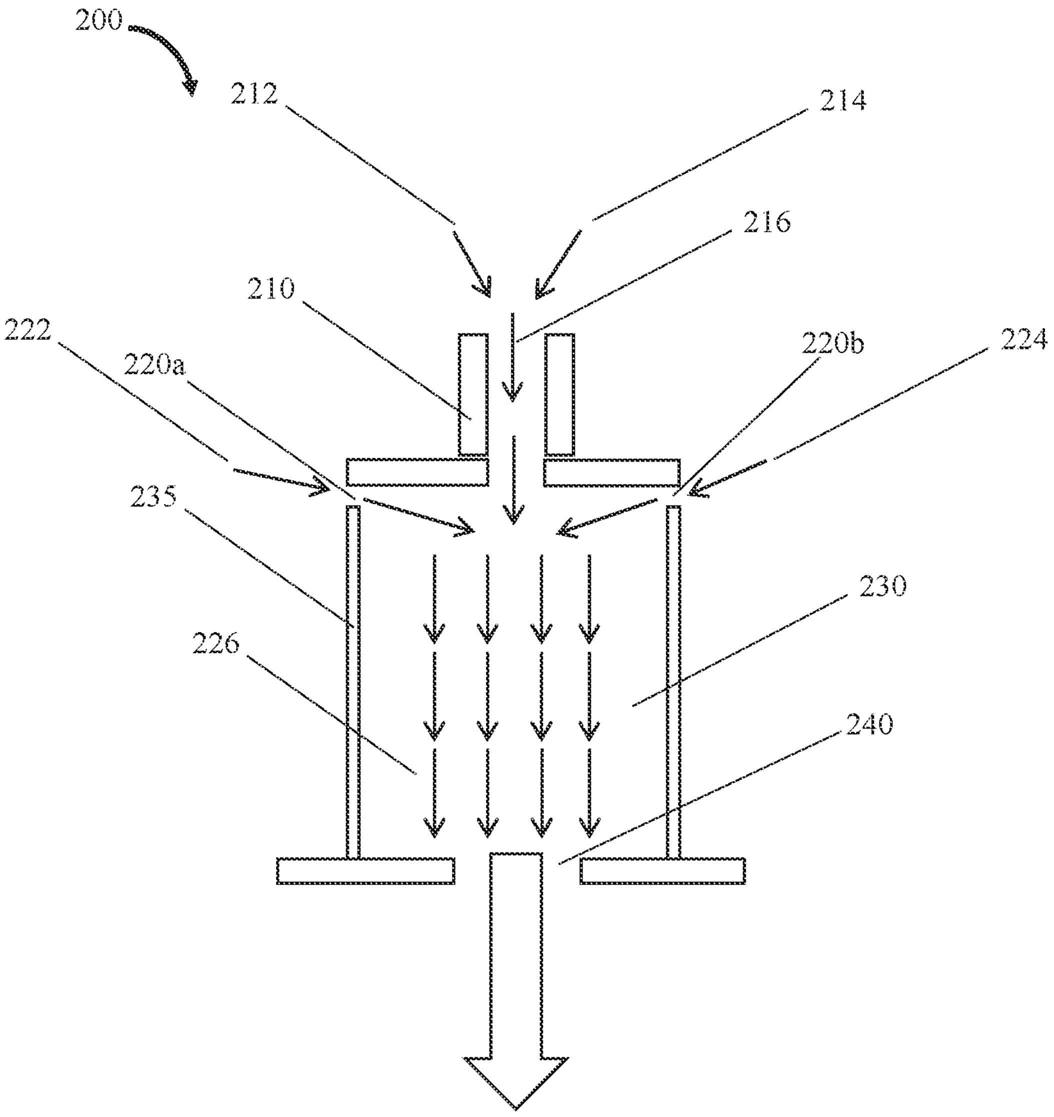
FIG. 2 is a diagram of a second example embodiment of a gas reactor according to the present disclosure.

FIG. 2 is a diagram of a second example embodiment of a gas reactor 200 according to the present disclosure. The gas reactor 200 may include a fuel gas 212, an oxidizer gas 214, and a torch gas inlet stream 216 that feed into a reactor chamber 230 and exit the reactor chamber via a torch outlet 240. In some embodiments, the fuel gas 212, the oxidizer gas 214, the torch gas inlet stream 216, the reactor chamber 230, and the torch outlet 240 may be the same as or similar to the respective fuel gas or the oxidizer gas. The torch gas inlet stream 116, the reactor chamber 130, and the torch outlet 150 as described in relation to FIG. 1.

The gas reactor 200 may include one or more gas reactant inlet ports 220*a* and 220*b* through which one or more gas reactants 222 and 224 may flow into the reactor chamber 230. In some embodiments, the gas reactant inlet ports 220*a* and 220*b* may be positioned along a top surface or a lateral surface of the reactor chamber 130. For example, the gas reactant inlet ports 220*a* and 220*b* may be positioned at an interface between the top surface and the lateral surface such that the gas reactants 222 and 224 enter the reactor chamber 230 at least partially tangential to one or more lateral surfaces 235 of the reactor chamber 230 to facilitate vortex flow of one or more gas reactant streams 226.

The torch gas inlet stream 216 and the gas reactant streams 226 may immediately begin mixing, and heat may immediately begin transferring between the torch gas inlet stream 216 and the gas reactant streams 226 because the torch gas inlet stream 216 and the gas reactant streams 226 may both be injected into the gas reactor 200 at least partially from the top surface of the reactor chamber 230. In some embodiments, the gas reactant streams 226 may provide a heat shielding effect as described in relation to the vortex reactant streams 126 in relation to FIG. 1 because the gas reactant streams 226 are injected into the gas reactor 200 closer to the lateral surfaces 235 of the reactor chamber 230 than the torch gas inlet stream 216.

After mixing and heating of the gas reactant streams 226 with the torch gas inlet stream 216, one or more chemical products may be yielded by reactions between the gas reactants 222 and 224. In some embodiments, the chemical products, the fuel gas 212, the oxidizer gas 214, and any remaining gas reactants 222 and 224 may flow out of the gas reactor 200 through the torch outlet 240. In these and other embodiments, the outgoing materials may be fed into a heat exchanger, piping, or another reactor to separate or further process the mixture of gaseous material.

Modifications, additions, or omissions may be made to the gas reactor 200 without departing from the scope of the present disclosure. For example, the designations of different elements in the manner described is meant to help explain concepts described herein and is not limiting. For instance, in some embodiments, the fuel gas 212, the oxidizer gas 214, the torch gas inlet stream 216, the gas reactants 222 and 224, and the gas reactant inlet ports 220*a* and 220*b* are delineated in the specific manner described to help with explaining concepts described herein but such delineation is not meant to be limiting. Further, the gas reactor 200 may include any number of other elements or may be implemented within other systems or contexts than those described.

Figure 3:
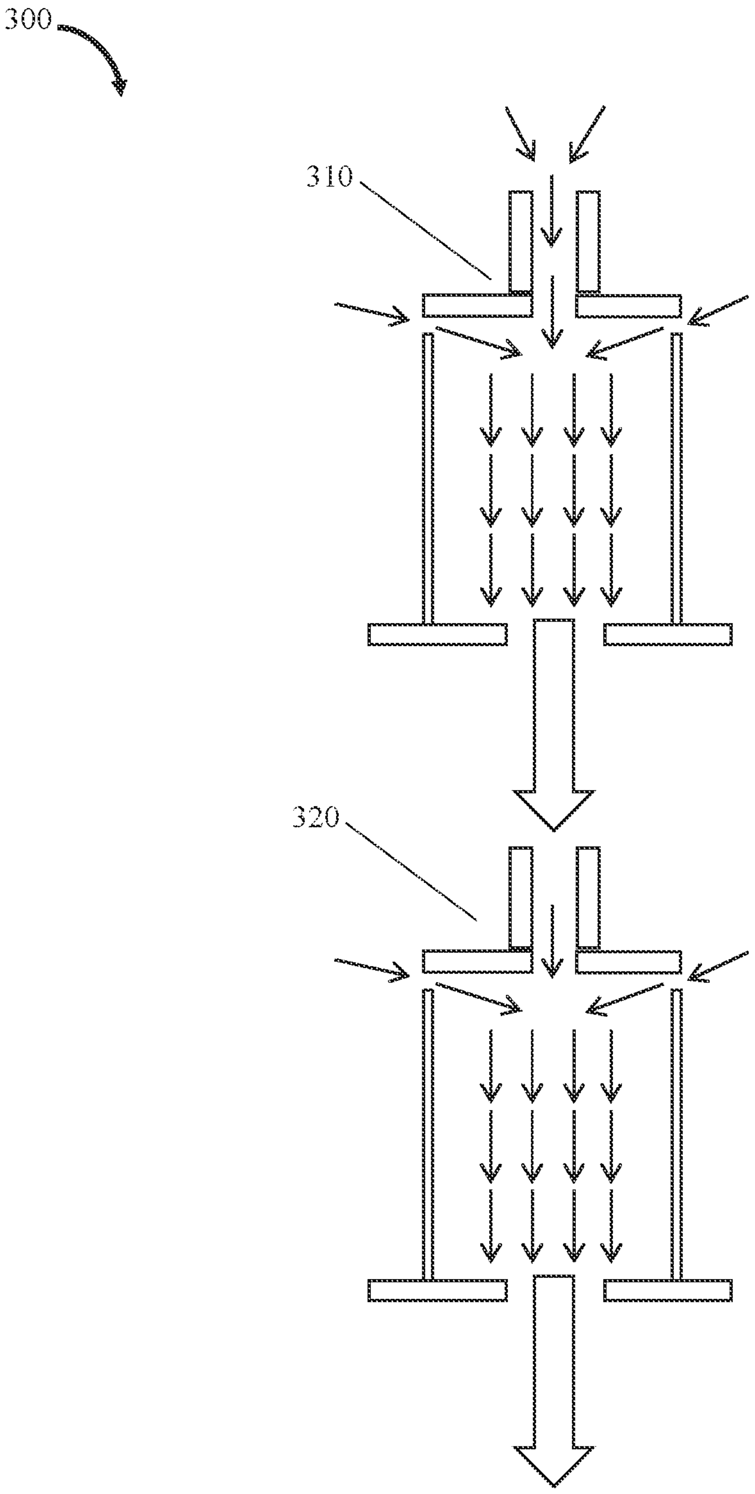
FIG. 3 is a diagram of a staged gas reactor according to the present disclosure.

FIG. 3 is a diagram of a staged gas reactor 300 according to the present disclosure. In some embodiments, the staged gas reactor 300 may include a first gas reactor stage 310, a second gas reactor stage 320, and any other gas reactors connected together in series. In these and other embodiments, each of the gas reactors, such as the first gas reactor stage 310 and the second gas reactor stage 320, may include a torch gas inlet port, one or more gas reactant inlet ports, and a torch outlet as described above in relation to the gas reactor 100 or the gas reactor 200 described in relation to FIG. 1 and FIG. 2, respectively. Further, each of the first gas reactor stage 310 or the second gas reactor stage 320 may include configurations that are the same as or similar to the gas reactor 100 or the gas reactor 200.

Although the first gas reactor stage 310 and the second gas reactor stage 320 are illustrated with gas reactant inlet ports the same as or similar to the gas reactant inlet ports 220*a* and 220*b* of the gas reactor 200, the first gas reactor stage 310 and/or the second gas reactor stage 320 may include any other configuration of gas reactant inlet ports, torch gas inlet ports, or torch outlets. For example, the first gas reactor stage 310 may be the same as or similar to the gas reactor 100 as described in relation to FIG. 1, while the second gas reactor stage 320 may be the same as or similar to the gas reactor 200 as described in relation to FIG. 2. Additionally or alternatively, the second gas reactor stage 320 may include a reactor chamber having a larger volume than the reactor chamber of the first gas reactor stage 310. Additionally or alternatively, the staged gas reactor 300 may include a third gas reactor stage or any other number of gas reactor stages that are configured the same as or similar to the gas reactor 100, the gas reactor 200, or any other gas reactor configuration (e.g., having gas reactant inlet ports along the lateral surfaces of the reactor chamber).

Modifications, additions, or omissions may be made to the staged gas reactor 300 without departing from the scope of the present disclosure. For example, the designations of different elements in the manner described is meant to help explain concepts described herein and is not limiting. For instance, in some embodiments, the first gas reactor stage 310 and the second gas reactor stage 320 are delineated in the specific manner described to help with explaining concepts described herein but such delineation is not meant to be limiting. Further, the staged gas reactor 300 may include any number of other elements or may be implemented within other systems or contexts than those described.

Figure 4:
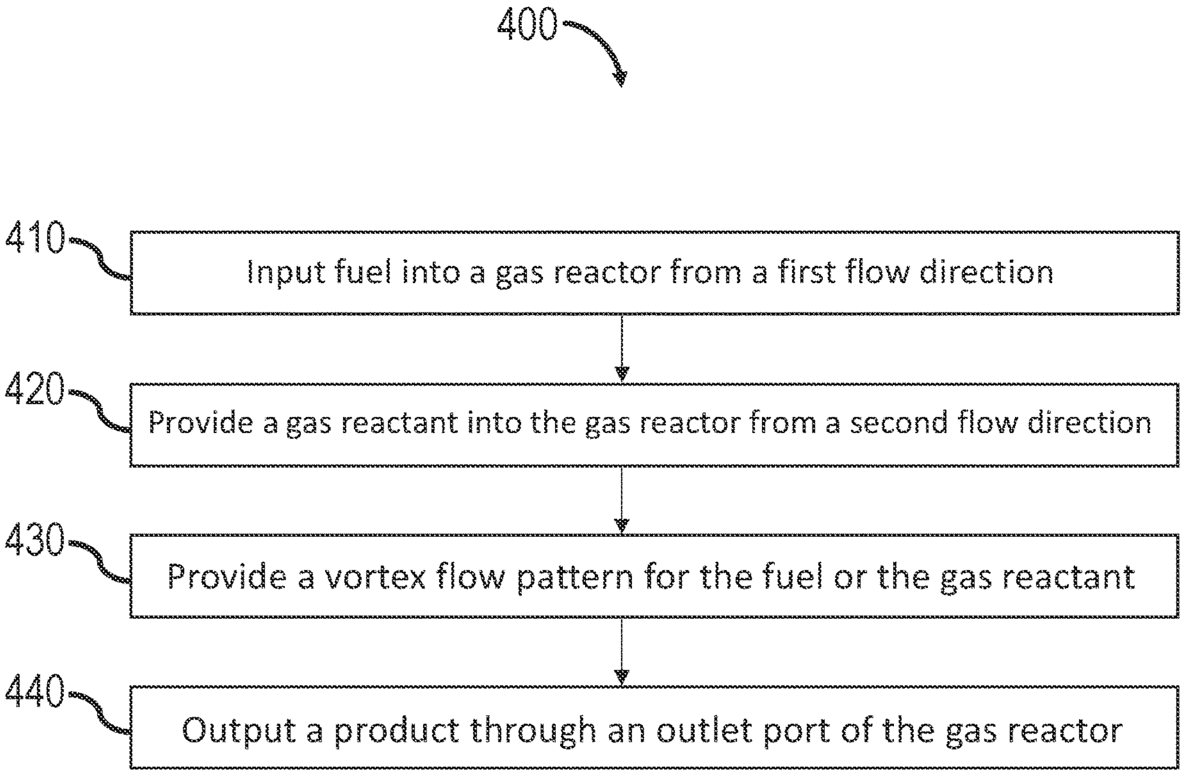
FIG. 4 is a flowchart of an example method of performing a gas reaction using a gas reactor according to at least one embodiment of the present disclosure.

FIG. 4 is a flowchart of an example method 400 of performing a gas reaction using a gas reactor according to at least one embodiment of the present disclosure. The method 400 may be performed by any suitable system, apparatus, or device. For example, the gas reactor 100, the gas reactor 200, or the staged gas reactor 300 may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 410 where fuel is input into the gas reactor from a second flow direction. The fuel may be input into the gas reactor from any surface of the gas reactor including the top surface, the bottom surface, or the lateral surfaces of the gas reactor. In some embodiments, the fuel input into the gas reactor may be input from the top surface or the bottom surface of the gas reactor such that the fuel is directed to flow concurrently with or countercurrent to the vortex flow of the gas reactants. Additionally or alternatively, the fuel input may be input from a center or near a center of the top surface or the bottom surface of the gas reactor such that the fuel gas is input into the gas reactor at a greater distance from the lateral surfaces of the gas reactor. In these and other embodiments, the gas reactants input into the gas reactor according to the operations at block 410 may be injected into the gas reactor closer to the lateral surfaces of the gas reactor to shield the lateral surfaces from the high temperature of the input fuel. Additionally or alternatively, the fuel input may include an oxidizer gas that flows concurrently with the fuel gas to facilitate reaction of the fuel gas. The oxidizer gas may facilitate reaction of the fuel gas such that heat may be extracted and provided for reaction of one or more gas reactants.

At block 420, one or more gas reactants are input into a gas reactor from a first flow direction. The gas reactants may be input into the gas reactor from a top surface, a bottom surface, or one or more lateral surfaces of the gas reactor. In some embodiments, the gas reactants may be input from an at least partially tangential direction to one or more of the lateral surfaces of the gas reactor to affect a vortex flow of the gas reactants in the gas reactor.

At block 430, a vortex flow pattern may be provided for one or more of the fuel or gas reactant moving within the gas reactor. Forming or facilitating the vortex flow pattern of either the fuel, the gas reactant, or both gas streams may be accomplished based on positioning or shape of the inlets for the fuel or the gas reactant, geometry of the gas reactor itself, inclusion of baffles inside the gas reactor, or any other technique as described in relation to the gas reactors 100, 200, and 300 of FIGS. 1, 2, and 3, respectively.

At block 440, one or more reactions between the gas reactants may output gas products that flow out of the gas reactor from an outlet port. The fuel gas and/or the oxidizer gas described in relation to the operations at block 440 may facilitate mixing and heating of the gas reactants, which may drive the gas reactants to react and yield one or more of the gas products. In some embodiments, the gas products may flow out of the gas reactor via one or more outlet ports, such as the torch outlets 150 and 240 as described in relation to FIGS. 1 and 2, respectively. The gas products, fuel gas, oxidizer gas, and remaining gas reactants flowing out of the gas reactor from the outlet port may be separated or otherwise processed such that the various gas components may be captured (e.g., the gas products), recycled (e.g., the fuel gas and the oxidizer gas), or sent to additional gas reactors (e.g., gas products, the fuel gas, the oxidizer gas, or the remaining gas reactants).

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

In the present description, for purposes of explanation, specific details are set forth in order to provide an understanding of the disclosure. It will be apparent, however, to one skilled in the art that the disclosure can be practiced without these details. Further, one skilled in the art will recognize that embodiments of the present disclosure, described below, may be implemented in a variety of ways.

Components or modules shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists that follow are examples and not meant to be limited to the listed terms.

To assist in the description of example embodiments, words such as top, bottom, front, rear, right, and left may be used to describe the accompanying figures. It will be appreciated that embodiments can be disposed in other positions, used in a variety of situations, and may perform a number of different functions. In addition, the drawings may be to scale and may illustrate various configurations, arrangements, aspects, and features of the gas reactor. It will be appreciated, however, that the present disclosure may include other suitable shapes, sizes, configurations, and arrangements depending, for example, upon the intended use or scale of project. Further, the gas reactor may include any suitable number of combinations of aspects, features and the like.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A gas reactor, comprising:

a reactor chamber having a first end, a second end, and a lateral surface that extends between the first end and the second end;

a torch inlet positioned at the first end of the reactor chamber, the torch inlet configured to receive a fuel and an oxidizer and to deliver, in a first flow direction into the reactor chamber, a heated torch gas stream produced by combustion of the fuel with the oxidizer, the heated torch gas stream providing a heat source for a reactant in the reactor chamber;

a reactant inlet positioned at the second end of the reactor chamber, wherein at least one of the fuel or a reactant moves through the reactor chamber in a vortex flow pattern; and an outlet port positioned at the second end of the reactor chamber, the outlet port configured for output flow of a product from the reactor chamber.

2. The gas reactor of claim 1, wherein the reactant inlet is configured to cause the reactant to flow into the reactor chamber in a second flow direction.

3. The gas reactor of claim 2, wherein the second flow direction is non-parallel with respect to the first flow direction.

4. The gas reactor of claim 2, wherein the reactant inlet is shaped to cause the reactant to flow into the reactor chamber in the second flow direction.

5. The gas reactor of claim 2, wherein the reactant inlet is positioned to cause the reactant to flow into the reactor chamber in the second flow direction.

6. The gas reactor of claim 2, wherein the reactant flowing into the reactor chamber in the second flow direction contributes to the vortex flow pattern.

7. The gas reactor of claim 1, wherein the reactant inlet is positioned at the second end of the reactor chamber and the positioning of the reactant inlet contributes to the vortex flow pattern.

8. The gas reactor of claim 1, wherein the first end and the second end each include a circular cross-section such that the reactor chamber includes a cylindrical shape, the cylindrical shape of the reactor chamber contributing to the vortex flow pattern.

9. The gas reactor of claim 1, wherein the vortex flow pattern is configured to invert and to follow the first flow direction of the heated torch gas stream in response to the vortex flow pattern reaching a top surface of the reactor chamber.

10. The gas reactor of claim 1, wherein the reactant inlet is configured to cause the vortex flow pattern to flow between the lateral surface of the reactor chamber and the heated torch gas stream.

11. The gas reactor of claim 1, wherein the reactant inlet is positioned along the lateral surface of the reactor chamber.

12. The gas reactor of claim 1, wherein the reactor chamber includes one or more baffles, wherein each of the baffles is positioned in a path of the vortex flow pattern.

13. The gas reactor of claim 1, further comprising a second reactor chamber, wherein the second reactor chamber includes:

a second torch inlet fluidically coupled to the outlet port of the reactor chamber;

a second reactant inlet; and a second outlet port.

14. The gas reactor of claim 13, wherein the second reactor chamber includes a larger volume than the reactor chamber.

15. The gas reactor of claim 1, wherein the reactant includes at least one of: carbon monoxide, hydrogen gas, water, carbon dioxide, or a hydrocarbon gas.

16. The gas reactor of claim 1, wherein the product includes at least one of: methanol, ethanol, hydrogen gas, carbon monoxide, carbon dioxide, water, ammonia, a polymeric plastic, a polymeric plastic monomer, a fabric, or one or more industrial chemicals.

17. A method, comprising:

inputting a fuel and an oxidizer into a torch inlet at a first end of a reactor chamber of a gas reactor, and combusting the fuel with the oxidizer at the torch inlet to produce a heated torch gas stream that flows from the torch inlet fuel into a fuel inlet in a first flow direction in the reactor chamber, wherein the reactor chamber includes the first end, a second end, and a lateral surface;

providing a gas reactant into a gas reactant inlet to the reactor chamber to cause the gas reactant to flow in a second flow direction in the reactor chamber, the heated torch gas stream providing a heat source for the gas reactant;

providing, in the reactor chamber, a vortex flow pattern comprising one or both of: the heated torch gas stream or the gas reactant, to move within the reactor chamber; and outputting a product based on the heated torch gas stream and the gas reactant through an outlet port at the second end of the reactor chamber.

18. The method of claim 17, wherein the first flow direction is countercurrent to the second flow direction.

19. The method of claim 17, wherein the gas reactant inlet is positioned at the second end of the reactor chamber such that the vortex flow pattern is configured to invert and to follow the first flow direction of the heated torch gas stream in response to the vortex flow pattern reaching the first end of the reactor chamber.

* * * * *